(12) United States Patent
Kenawy

(10) Patent No.: US 11,277,289 B1
(45) Date of Patent: Mar. 15, 2022

(54) DEMODULATION UNIT AND METHOD FOR DEMODULATING A DPSK SIGNAL

(71) Applicant: Dialog Semiconductor B.V., 's-Hertogenbosch (NL)

(72) Inventor: Hamed Kenawy, Eindhoven (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 17/104,814

(22) Filed: Nov. 25, 2020

(51) Int. Cl.
*H04L 27/22* (2006.01)
*H04L 27/233* (2006.01)
*H04L 27/00* (2006.01)

(52) U.S. Cl.
CPC ...... *H04L 27/2338* (2013.01); *H04L 27/0008* (2013.01); *H04L 27/2331* (2013.01); *H04L 2027/0057* (2013.01)

(58) Field of Classification Search
CPC ............. H04L 27/2338; H04L 27/0008; H04L 27/2331; H04L 2027/0057
USPC ................................. 375/329–331
See application file for complete search history.

(56) References Cited

U.S. PATENT DOCUMENTS

| | | | |
|---|---|---|---|
| 5,202,643 A | 4/1993 | Sato | |
| 2003/0058036 A1* | 3/2003 | Stillman | H04L 27/2272 329/304 |
| 2005/0008101 A1* | 1/2005 | Kazi | H04L 27/2332 375/330 |
| 2005/0207519 A1* | 9/2005 | Phang | H04L 27/2278 375/354 |
| 2007/0268980 A1* | 11/2007 | Brannstorm | H04B 7/0848 375/265 |
| 2018/0006857 A1* | 1/2018 | Avner | H04W 4/80 |
| 2019/0050956 A1* | 2/2019 | Kossin | H04L 9/0891 |

OTHER PUBLICATIONS

"BER Expressions for Differentially Detected π/4 DQPSK Modulation," by Leonard E. Miller et al., IEEE Transactions on Communications, vol. 46, No. 1, Jan. 1998, pp. 71-81.
"Throughput and Energy Efficiency of Bluetooth v2 + EDR in Fading Channels," by Andrea Zanella et al., 2008 EEE Wireless Communications and Networking Conference, Mar. 31-Apr. 3, 2008, pp. 1661-1666.

* cited by examiner

*Primary Examiner* — Don N Vo
(74) *Attorney, Agent, or Firm* — Saile Ackerman LLC; Stephen B. Ackerman

(57) ABSTRACT

A demodulation unit for recovering a transmitted symbol from a received signal that has been modulated using an MDPSK modulation scheme is described. The demodulation unit is configured to, for a current time instant, derive a current sample of a phase signal indicative of a phase of the received signal. Furthermore, the demodulation unit is configured to determine a set of discrimination signals for the current sample of the phase signal, based on the current sample of the phase signal and based on one or more previous samples of the phase signal for one or more previous time instants. In addition, the demodulation unit is configured to determine the transmitted symbol for the current time instant based on the set of discrimination signals.

16 Claims, 3 Drawing Sheets

DEMODULATION UNIT AND METHOD FOR DEMODULATING A DPSK SIGNAL

TECHNICAL FIELD

The present document relates to recovering data from a modulated signal that has been transmitted over a noisy transmission network. In particular, the present document relates to the reliable and robust demodulation of a DPSK (Differential Phase Shift Keying) modulated signal that has been transmitted over a noisy transmission network.

BACKGROUND

Data, notably symbols comprising two or more bits, may be modulated onto a carrier signal using a modulation scheme such as DPSK, in order to generate a modulated signal for transmission over a transmission network. At the receiver the data may be recovered from the (distorted) modulated signal using a demodulation scheme.

SUMMARY

The present document addresses the technical problem of providing a reliable and robust demodulation scheme for a MDPSK modulated signal. The technical problem is solved by the independent claims. Preferred examples are described in the dependent claims.

According to an aspect, a demodulation unit for recovering a transmitted symbol from a received signal that has been modulated using an M-ary Differential Phase Shift Keying, MDPSK, modulation scheme is described. The demodulation unit is configured to derive a current sample of a phase signal indicative of the phase of the received signal. Furthermore, the demodulation unit is configured to determine a set of discrimination signals for the current sample of the phase signal, based on the current sample of the phase signal and based on one or more previous samples of the phase signal for one or more previous time instants. In addition, the demodulation unit is configured to determine the transmitted symbol for the current time instant based on the set of discrimination signals.

According to another aspect, a method for recovering a transmitted symbol from a received signal that has been modulated using an M-ary Differential Phase Shift Keying, MDPSK, modulation scheme is described. The method comprises deriving a current sample of a phase signal indicative of the phase of the received signal. In addition, the method comprises determining a set of discrimination signals for the current sample of the phase signal, based on the current sample of the phase signal and based on one or more previous samples of the phase signal for one or more previous time instants. Furthermore, the method comprises determining the transmitted symbol for the current time instant based on the set of discrimination signals.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DETAILED DESCRIPTION

As outlined above, the present document is directed at providing a reliable and robust demodulation scheme for a DPSK modulated signal. M-ary Differential Phase Shift Keying (MDPSK or DMPSK) may be referred to be differentially encoded and differentially coherently demodulated MPSK (M-ary Phase Shift Keying). The differential coherent demodulation is a noncoherent demodulation scheme, which means that phase coherent reference signals are not needed for demodulation. This feature makes the demodulation process of MDPSK typically simpler than the demodulation of MPSK. On the other hand, this may degrade the performance.

Figure 1A:
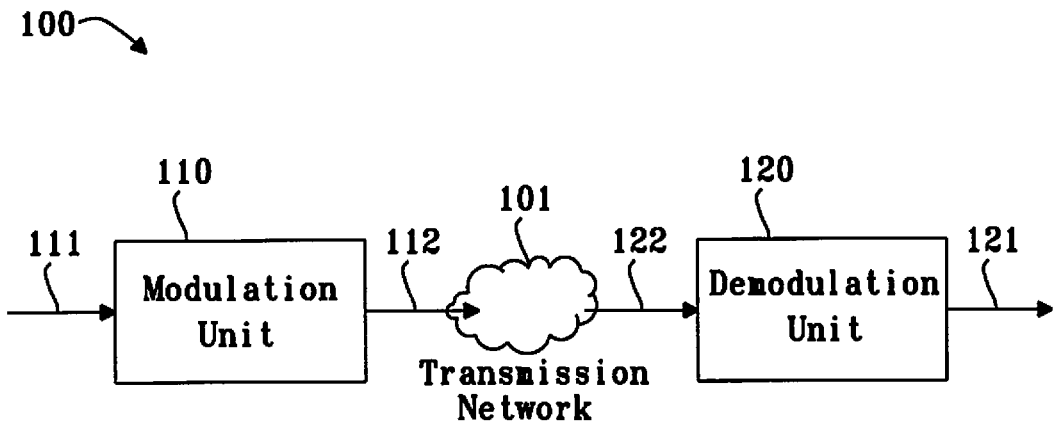
FIG. 1A shows an example data transmission system.

FIG. 1A shows an example transmission system 100 which comprises a modulation unit 110 and a demodulation unit 120. The modulation unit 110 is configured to encode input data 111 (notably a sequence of bits) into a sequence 112 of symbols. The sequence 112 of symbols is modulated onto a carrier signal which is transmitted over a transmission network 101.

The transmitted, modulated carrier signal may be sampled to recover a sequence 122 of symbol samples. The demodulation unit 120 may be configured to recover the output data 121 (which should be equal to the input data 111) based on the sequence 122 of symbol samples.

The MDPSK modulation scheme may be used in various different applications, notably due to its power spectral efficiency. In the Wireless LAN specification IEEE 802.11b, DBPSK and DQPSK may be used, depending on the required data rate. ZigBee makes use of DBPSK at 868/915 MHz. Bluetooth makes use of $$\frac{\pi}{4}$$

DQPSK and 8DPSK in it version 2+ EDR (Enhanced Data Rate). For relatively small values of M, the following alias terms may be used: B=binary (M=2) and Q=quarternary (M=4). For relatively high values of M, the numeric value may be used in the naming of the modulation scheme.

In the following, the modulation schemes that are used in Bluetooth are considered as examples. It should be noted, however, that the methodology may be used for any other MDPSK modulation scheme. The $\frac{\pi}{4}$ DQPSK modulation scheme and the 8DPSK modulation scheme are described herein as examples. Furthermore, the demodulation scheme, which is described herein, is described using the above-mentioned example modulation schemes.

Generally, in the MDPSK modulation scheme, each sequence of $\log_2(M)$ successive bits $b_q$ of Q data bits, q=1, 2, ... Q, may be mapped onto a corresponding symbol $B_n$, n=1, 2, ....

$$\frac{Q}{\log_2(M)}.$$

Each symbol $B_n$ corresponds to a prescribed phase change $\Delta\varphi_n$, as defined by the mapping table or constellation diagram of the MDPSK modulation scheme. The mapping between the binary input $b_q$, q=1, 2, ... Q, the data symbol $B_n$ and the phase difference $\Delta\varphi_n$ is illustrated in Table 1 for $\frac{\pi}{4}$ DQPSK and in Table 2 for 8DPSK. The relation between $B_n$ and $b_q$ in Tables 1 and 2 may be obtained using Gray coding.

TABLE 1

| $B_n$ | $b_{2n-1}$ | $b_{2n}$ | $\Delta\varphi_n$ |
|---|---|---|---|
| 0 | 0 | 0 | π/4 |
| 2 | 0 | 1 | 3π/4 |
| 3 | 1 | 1 | −3π/4 |
| 1 | 1 | 0 | −π/4 |

TABLE 2

| $B_n$ | $b_{3n-2}$ | $b_{3n-1}$ | $b_{3n}$ | $\Delta\varphi_n$ |
|---|---|---|---|---|
| 0 | 0 | 0 | 0 | 0 |
| 4 | 0 | 0 | 1 | π/4 |
| 6 | 0 | 1 | 1 | π/2 |
| 2 | 0 | 1 | 0 | 3π/4 |
| 3 | 1 | 1 | 0 | π |
| 7 | 1 | 1 | 1 | −3π/4 |
| 5 | 1 | 0 | 1 | −π/2 |
| 1 | 1 | 0 | 0 | −π/4 |

A sequence of symbols $B_n$ may be represented by a sequence of complex values $s_n$, situated on the unit circle and in which $s_0 = 1+0i$ or some other arbitrary value of magnitude 1. Additionally, to improve the performance a Gray coding is usually applied. The signal $s_n$ may be defined as $$s_n = s_{n-1} e^{j\Delta\varphi_n}, n \in \mathbb{N}^+, s_0 = 1 \tag{1}$$

wherein the phase difference values $\Delta\varphi_n$ may be obtained using the underlying mapping table of the modulation scheme.

Figure 1B:
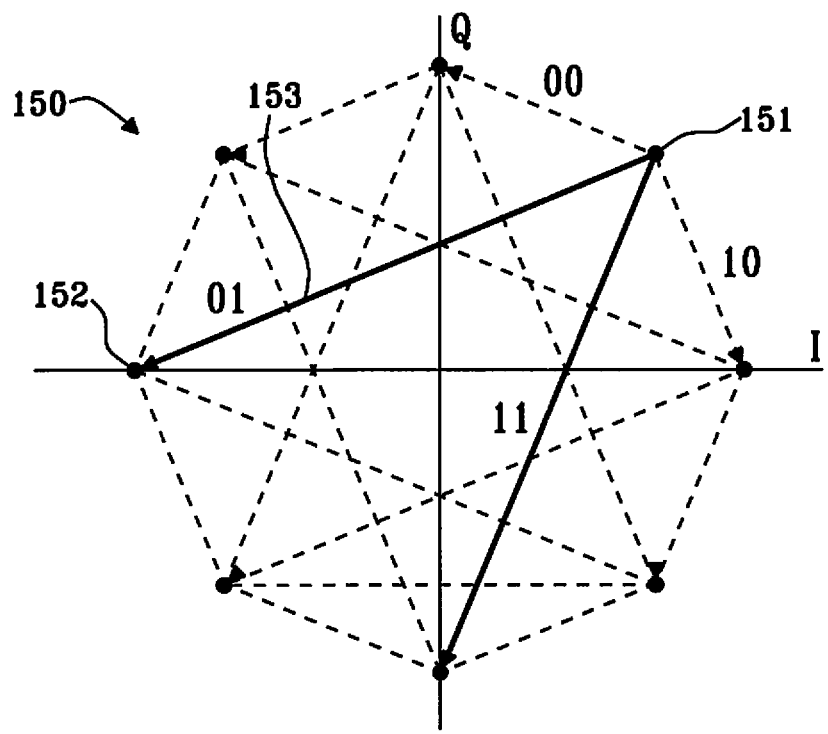
FIGS. 1B and 1C illustrate example constellation diagrams.

As may be seen from FIG. 1B, the $\frac{\pi}{4}$ DQPSK modulation scheme alternatively selects the modulated signal points from two QPSK constellations that have a phase of $\frac{\pi}{4}$.

In particular, FIG. 1B shows the constellation diagram 150 of the $\frac{\pi}{4}$ DQPSK modulation scheme, wherein the constellation diagram 150 indicates which set of target constellation points 152 may directly follow a source constellation point 151. Hence, FIG. 1B shows the possible transitions 153 between a source constellation point 151 and the possible target constellation point 152 (according to the possible phase difference values $\Delta\varphi_n$). As can be seen from FIG. 1B, the signal constellation of $\frac{\pi}{4}$ DQPSK does not snow transitions 153 from one symbol 151 to another symbol 152, which go through the origin of the constellation diagram 150, indicating that the envelope of this modulation scheme exhibits less variations than the envelope of DQPSK without the $\frac{\pi}{4}$ offset, such that the allowed phase jumps $\Delta\varphi_n$ are 0, 90, 180 and −90 degrees.

The $\frac{\pi}{4}$ DQPSK modulation scheme may be differentially demodulated. For $\frac{\pi}{4}$ DQPSK with Gray coding, the BEP (Bit Error Probability) $P_b$ may be approximated using $$P_b \approx Q\left(\sqrt{1.176 \cdot \frac{E_b}{N_0}}\right) \quad (2)$$

where $Q(\cdot)$ is the Gaussian distribution Q-function and where $$\frac{E_b}{N_0}$$

is the bit energy-to-noise density ratio.

Unlike the $$\frac{\pi}{4}$$

Figure 1C:
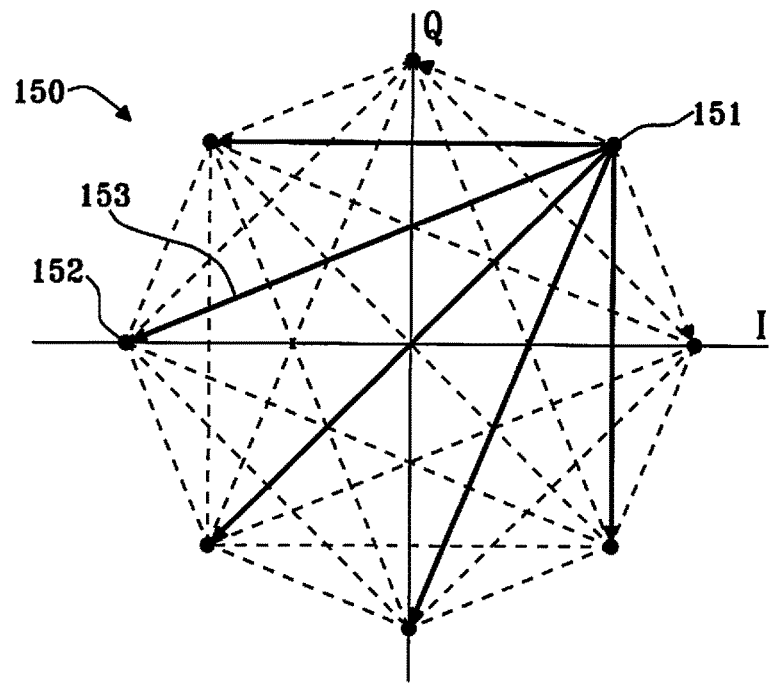

DQPSK, the 8DQPSK modulation uses all modulated signal points in the constellation 150 as shown in FIG. 1C. Hence, a transition 153 from one symbol 151 to another symbol 152 may go through the origin. The 8DPSK modulation scheme may be differentially demodulated. The BEP for 8DPSK with Gray coding $P_b$ is given by $$P_b = \frac{2}{\log_2(M)} Q\left(\sqrt{2 \cdot \log_2(M) \cdot \frac{E_b}{N_0}} \sin\left(\frac{\pi}{\sqrt{2}\,M}\right)\right) \quad (3)$$

where M=8. It should be noted that equation (3) may be approximately $$\frac{\pi}{4}$$

DQPSK, for M=4.

In the present document, a demodulation scheme is described which exploits the fact that successive symbols are typically not (entirely) independent from one another, due to the fact that the phase differences $\Delta\varphi_n$ of successive symbols follow a specific trajectory imposed by the modulation scheme. As a result of this, the probability distribution of the possible target symbols 152 following a source symbol 151 is typically non-uniform. In particular, a demodulation scheme is described which is directed at mapping a trajectory of successive symbols to the closed possible trajectory of symbols, in order to compensate for a symbol error. By doing this, benefit can be taken from the entire trajectory of symbols.

In particular, a MDPSK demodulator 120 using Viterbi algorithm is described, wherein the Viterbi algorithm may be used for exploiting the correlation between successive symbols 151, 152. Hence, the demodulator considers the memory in the modulation schemes. By using this feature, the same error probability may be achieved for a bit energy-to-noise density ratio that is 1 to 1.5 dB lower than a demodulation scheme that does not exploit the correlation between successive symbols 151, 152.

Figure 2:
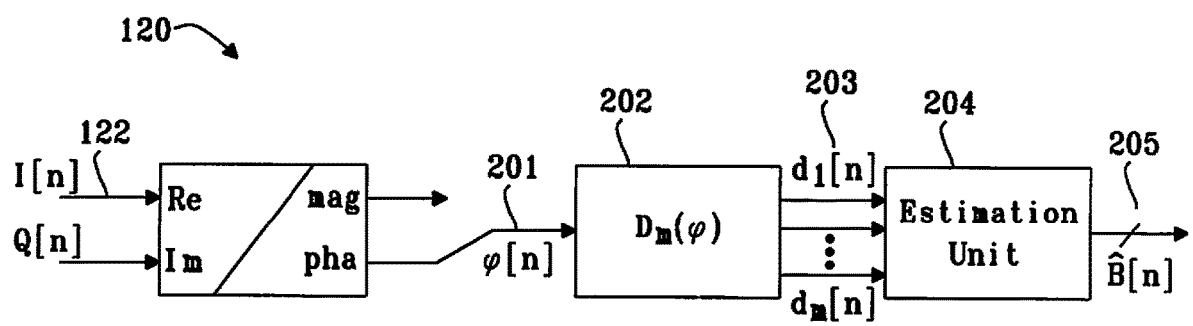
FIG. 2 shows a block diagram of an example demodulation unit.

FIG. 2 shows a block diagram of the demodulator or demodulation unit 120. The ADC (Analog-to-Digital Converter) of the receiver may be configured to provide the samples 122 of the received signal as a fixed amplitude cosine (I), i.e. in-phase component, and sine (Q), i.e. quadrature component, of a baseband carrier with frequency modulation. After filtering the signal to reduce the noise level, the PM (phase modulation) signal $\varphi(n)$ 201 may be obtained from the I-Q samples 122. It should be noted that some receivers may be configured to deliver the baseband PM signal 201 directly from the received signal, in which case the I-Q samples are not relevant. By making use of the PM signal 201, the demodulation scheme may be adapted in a flexible manner to different MDPSK constellations 150. Furthermore, the computational complexity may be reduced.

The demodulation unit 120 comprises a discrimination signal generator $D_m(\varphi)$ 202 which is configured to convert the PM signal 201 into m signals that contain information about the current data symbol and its m−1 predecessors. The knowledge about this history allows correction of errors in the symbol stream, thereby decreasing the error probability for the same bit energy to noise density ratio. The discrimination signals may be generated from the PM signal 201 in a flexible and efficient manner using the following formula $$d_m[n] = \varphi[n] - \varphi[n - m \cdot N_s] \quad (4)$$

wherein $N_s$ is the oversampling rate. Hence, for a time instant n, m different discrimination signals $d_m[n]$ 203 may be generated, wherein the different discrimination signals $d_m[n]$ 203 also depends on the PM signal 201 at a time instant $n - m \cdot N_s$ prior to the time instant n.

The discrimination signals 203 may be fed into an estimation unit 204 which is configured to estimate the transmitted $n^{th}$ symbol $\hat{B}[n]$ 205 based on the set of discrimination signals 203. The estimation unit 204 may be configured to estimate the most likely symbol $\hat{B}[n]$ 205, taking into account one or more previously estimated symbols $\hat{B}[n-1]$, $\hat{B}[n-2], \ldots$. The estimation unit 205 may make use of the Viterbi algorithm.

The $$\frac{\pi}{4}$$

DQPSK modulation scheme may be considered as an example. By assuming m=2, Table 3 may be generated, which indicates the to-be-expected (i.e. target) discrimination signals 203 for different sequences (notably pairs) of symbols 151, 152. Table 3 may be considered to be the $$\frac{\pi}{4}$$

DQPSK discrimination signals truth table.

TABLE 3

| $d_1[n]$ | $d_2[n]$ | $B_{n-1}$ | $B_n$ |
|---|---|---|---|
| π/4 | π/2 | 0 | 0 |
| π/4 | 0 | 0 | 1 |
| π/4 | π | 0 | 2 |
| π/4 | −π/2 | 0 | 3 |
| −π/4 | 0 | 1 | 0 |
| −π/4 | −π/2 | 1 | 1 |
| −π/4 | π/2 | 1 | 2 |
| −π/4 | π | 1 | 3 |
| 3π/4 | π | 2 | 0 |
| 3π/4 | π/2 | 2 | 1 |
| 3π/4 | −π/2 | 2 | 2 |

TABLE 3-continued

| $d_1[n]$ | $d_2[n]$ | $B_{n-1}$ | $B_n$ |
|---|---|---|---|
| 3π/4 | 0 | 2 | 3 |
| −3π/4 | −π/2 | 3 | 0 |
| −3π/4 | π | 3 | 1 |
| −3π/4 | 0 | 3 | 2 |
| −3π/4 | π/2 | 3 | 3 |

As can be seen from Table 3, $d_1$ [n] is equivalent to $\Delta\varphi_n$ in Table 1. On the other hand, the signal $d_2$ [n] is the phase difference between symbol n and symbol n−2.

Using Table 3, a 16 state-Viterbi trellis diagram may be generated. Each state in the trellis exhibits four branches as an output with a cost function c as given in (5)

$$c[n] = |wrapToPi(d_1[n] - \hat{d}_1[n])| + |wrapToPi(d_2[n] - \hat{d}_2[n])| \quad (5)$$

where $\hat{d}_1[n]$ and $\hat{d}_2$ [n] are the calculated discrimination signals 203 based on the received phase signal 201, including noise. Equation (5) can be generalized as:

$$c[n] = \sum_{m=1}^{Z} |wrapToPi(d_m[n] - \hat{d}_m[n])| \quad (6)$$

where the function wrapToPi(α) wraps the angle α in radians in the interval [−π, π], and where m=1, . . . , Z, with Z>1.

It is clear from Table 3 that the received sequence of symbols can be represented in a state diagram. This state diagram has the property that from any specific state only four state transitions (in general M transitions for an MDPSK modulation scheme) to four other states (in general M states) out of the available 16 states (in general $M^m$) are possible. Hence, if an error occurs at the receiver from a specific state to one of the 12 unexpected states, this error can be recovered by the Viterbi algorithm.

The same methodology can be applied on 8DPSK and to any MDPSK modulation scheme. In 8DPSK modulation scheme, the Viterbi trellis diagram has 64 states. Each state in the trellis diagram has 8 branches with the same cost function as shown in (5) or (6).

Generally, the MDPSK Viterbi demodulator 120 comprises $M^m$ states and $L_{tb}$ trace back length. The trace back length $L_{tb}$=M for optimal performance. At each state, the survival path may be selected, which is the minimum of c[n] plus the previous path metric, i.e. with the minimal cumulated cost.

The maximum likelihood sequence is the sequence that has the minimum path metric accumulation (i.e. the minimum cumulated cost) over $L_{tb}$ bits, $$C_{L_{tb}}(L_{tb}) = \min\left(\sum_{n=1}^{L_{tb}} c[n]\right) \quad (7)$$

It can be shown that using the scheme outlined in the present document, the bit error rate (BER) may be reduced (compared to a conventional demodulator).

As indicated above, oversampling may be applied for determining the PM signals 201 and the discrimination signals 203. The estimation unit 204, notably the Viterbi algorithm, may be executed in the down-sampled domain, thereby reducing the computational complexity and power consumption.

Hence, a demodulation unit 120 for recovering a transmitted symbol 205 from a received signal 122 that has been modulated using an M-ary Differential Phase Shift Keying, DPSK, modulation scheme is described. The MDPSK modulation scheme may be a $$\frac{\pi}{4}$$

DQPSK modulation scheme or a 8DPSK modulation scheme.

The demodulation unit 120 may be configured to, for a current time instant, derive a current sample of a phase signal 201 indicative of a phase of the received signal 122. For this purpose, the demodulation unit may be configured to determine an in-phase sample of the received signal and to determine a quadrature sample of the receive sample. The current sample of the phase signal may then be determined based on the in-phase sample and based on the quadrature sample.

Furthermore, the demodulation unit 120 may be configured to determine a set of discrimination signals 202 for the current sample of the phase signal 201, based on the current sample of the phase signal 201 and based on one or more previous samples of the phase signal 201 for one or more previous time instants. The set of discrimination signals 202 may comprise two or more discrimination signals 202.

In addition, the demodulation unit 120 may be configured to determine the transmitted symbol 205 for the current time instant based on the set of discrimination signals 202. In particular, the transmitted symbol 205 for the current time instant may be determined based on the set of discrimination signals 202 using a maximum likelihood detection scheme, notably using the Viterbi algorithm.

The demodulation unit 120 makes use of multiple samples of the phase signal 201 at multiple different time instants, thereby exploiting correlations between the transmitted symbols at multiple different time instants. By doing this, the robustness and the reliability of demodulation may be improved.

The demodulation unit is typically configured to derive a current sample of the phase signal 201, to determine a set of discrimination signals 202, and to determine the transmitted symbol 202 for a sequence of current time instants, thereby iteratively recovering a sequence of transmitted symbols 205 for a corresponding sequence of current time instants n.

The demodulation unit may be configured to determine a first discrimination signal 202 $\hat{d}_1$ [n] based on the current sample of the phase signal for the current time instant n and based on a previous sample of the phase signal 201 for a first previous time instant, notably n−1. In addition, a second discrimination signal 202 $\hat{d}_2$ [n] may be determined based on the current sample of the phase signal 201 for the current time instant n and based on a previous sample of the phase signal 201 for a second previous time instant, notably n−2. The transmitted symbol 205 for the current time instant n may then be determined in a reliable and robust manner based on the first discrimination signal 202 and based on the second discrimination signal 202.

In particular, the set of discrimination signals $\hat{d}_m[n]$ 202, with m=1, . . . , Z, and with Z>1, for the current time instant n may be determined as $$\hat{d}_m[n] = \varphi[n] - \varphi[n - m \cdot N_s]$$

wherein $\varphi[n]$ is the current sample of the phase signal 201 for the current time instant n; wherein $\varphi[n-m \cdot N_s]$ is the previous sample of the phase signal 201 for the previous time instant $n-m \cdot N_s$; and wherein $N_s$ is an oversampling factor with $N_s \geq 1$. It should be noted, that if oversampling ($N_s > 1$) is used, then sub-time instants k may be used. Oversampling may be used to further increase the reliability and robustness of demodulation.

The demodulation unit 120 may be configured to determine the transmitted symbol 205 for the current time instant n in dependence of a truth table which is indicative of a plurality of target sets of discrimination signals $d_m[n]$ for a corresponding plurality of sets of possibly transmitted symbols. An example truth table for the $$\frac{\pi}{4}$$

DQPSK modulation scheme is shown in Table 3. The truth table depends on the constellation diagram 150 and/or on possible transitions 153 between constellation points 151, 152 of the constellation diagram 150 of the MDPSK modulation scheme. By taking into account a truth table for the set of discrimination signals 202, a particularly precise and reliable demodulation may be achieved.

The demodulation unit 120 may be configured to determine a plurality of cost values of a cost function for the corresponding plurality of target sets of discrimination signals [n]. The cost function for a particular target set of discrimination signals $d_m[n]$ may be indicative of a deviation of the determined set of discrimination signals $d_m[n]$ 202 from the particular target set of discrimination signals $d_m[n]$. The cost function may comprise an accumulation of the magnitude of the deviation, e.g. of the square root of the sum of the deviations. The cost function may make use of a weighing function for the different deviation terms.

In particular, the cost function c[n] for the particular target set of discrimination signals $d_m[n]$ may be determined as $$c[n] = \sum_{m=1}^{Z} |wrapToPi(d_m[n] - \hat{d}_m[n])|$$

wherein the function wrapToPi(a) wraps an angle α in radians in the interval $[-\pi, \pi]$.

The demodulation unit 120 may be configured to determine the transmitted symbol 205 for the current time instant n in dependence of the plurality of cost values of the cost function for the corresponding plurality of target sets of discrimination signals $d_m[n]$. By way of example, the transmitted symbol 205 (i.e. the most probable symbol) may be selected based on the minimum cost. In particular, the demodulation unit 120 may be configured to determine the transmitted symbol 205 for the current time instant n in dependence of the minimum of the plurality of cost values of the cost function for the corresponding plurality of target sets of discrimination signals $d_m[n]$, notably in dependence of the transition 153 between constellation points 151, 152 of the constellation diagram 150 of the MDPSK modulation scheme that corresponds to the minimum of the plurality of cost values of the cost function for the corresponding plurality of target sets of discrimination signals $d_m[n]$. As a result of this, the robustness and the reliability of demodulation may be increased further.

The demodulation unit 120 may be configured to populate a state trellis for the current time instant n using the plurality of cost values of the cost function for the corresponding plurality of target sets of discrimination signals $d_m[n]$. The state trellis comprises a plurality of different states for the corresponding plurality of target sets of discrimination signals $d_m[n]$. In particular, the state trellis comprises $M^m$ different states. The state trellis may be indicative of cumulated cost values for the plurality of different states of the state trellis for the previous time instant n−1.

The demodulation unit 120 may be configured to determine the cumulated cost values for the plurality of different states of the state trellis for the current time instant n based on the cumulated cost values for the plurality of different states of the state trellis for the previous time instant n−1 and based on the plurality of cost values of the cost function for the corresponding plurality of target sets of discrimination signals $d_m[n]$. Furthermore, the demodulation unit 120 may be configured to determine the transmitted symbol 205 for the current time instant n based on cumulated cost values associated with the plurality of different states of the state trellis for the current time instant n. As a result of this, correlations between successive symbols may be exploited in a particularly reliable manner, thereby increasing the reliability and the robustness of demodulation.

Figure 3:
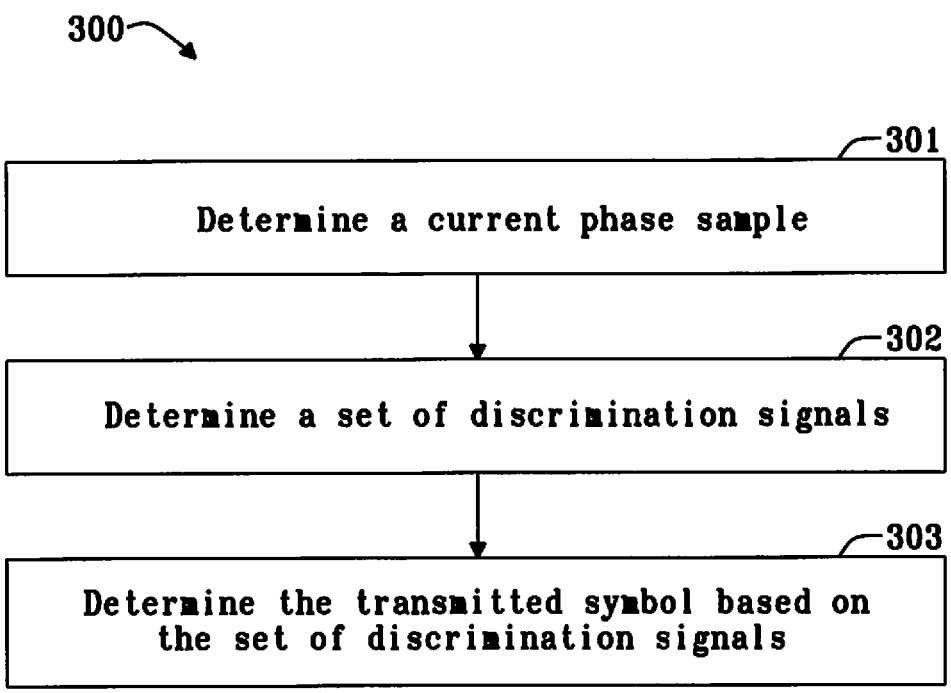
FIG. 3 shows a flow chart of an example method for demodulating a (distorted) DPSK modulated signal.

FIG. 3 shows a flow chart of an example (notably computer-implemented) method 300 for recovering a transmitted symbol 205 from a received signal 122 that has been modulated using an M-ary Differential Phase Shift Keying, MDPSK, modulation scheme. The method may be repeated in an iterative manner for a sequence of current time instants, in order to recover a corresponding sequence of transmitted symbols 205.

The method 300 comprises, for a current time instant, deriving 301 a current sample of a phase signal 201 indicative of the phase of the received signal 122. Furthermore, the method 300 comprises determining 302 a set of (two or more) discrimination signals 202 for the current sample of the phase signal 201, based on the current sample of the phase signal 201 and based on one or more previous samples of the phase signal 201 for one or more previous time instants. In addition, the method 300 comprises determining 303 the transmitted symbol 205 for the current time instant based on the set of discrimination signals 202. By making use of samples of the phase signal 201 at multiple time instants for recovering the transmitted symbol 205 at the current time instant, recovery of the transmitted symbol 205 may be performed in a particularly reliable manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiments outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A demodulation unit for recovering a transmitted symbol from a received signal that has been modulated using an M-ary Differential Phase Shift Keying, MDPSK, modulation scheme; wherein the demodulation unit is configured to, for a current time instant, derive a current sample of a phase signal indicative of a phase of the received signal;

determine a set of discrimination signals for the current sample of the phase signal, based on the current sample of the phase signal and based on one or more previous samples of the phase signal for one or more previous time instants; and determine the transmitted symbol for the current time instant based on the set of discrimination signals;

wherein the set of discrimination signals $\hat{d}_m[n]$, with $m=1, \ldots, Z$, with $Z>1$, for the current time instant n is determined as $$\hat{d}_m[n] = \varphi[n] - \varphi[n - m \cdot N_s]$$

wherein $\varphi[n]$ is the current sample of the phase signal for the current time instant n;

wherein $\varphi[n - m \cdot N_s]$ is the previous sample of the phase signal for the previous time instant $n - m \cdot N_s$; and wherein $N_s$ is an oversampling factor with $N_s \geq 1$.

2. The demodulation unit of claim 1, wherein the demodulation unit is configured to, for the current time instant,
determine an in-phase sample of the received signal;
determine a quadrature sample of the received signal; and
determine the current sample of the phase signal based on a combination of the in-phase sample and the quadrature sample.

3. The demodulation unit of claim 1, wherein the demodulation unit is configured to, for the current time instant,
determine a first discrimination signal $\hat{d}_1[n]$ based on the current sample of the phase signal for the current time instant n and based on a previous sample of the phase signal for a first previous time instant;
determine a second discrimination signal $\hat{d}_2[n]$ based on the current sample of the phase signal for the current time instant n and based on a previous sample of the phase signal for a second previous time instant; and
determine the transmitted symbol for the current time instant n based on the first discrimination signal and based on the second discrimination signal.

4. The demodulation unit of claim 1, wherein
the demodulation unit is configured to determine the transmitted symbol for the current time instant n in dependence of a truth table which is indicative of a plurality of target sets of discrimination signals $d_m[n]$ for a corresponding plurality of sets of possibly transmitted symbols; and
the truth table depends on a constellation diagram and possible transitions between constellation points of the constellation diagram of the MDPSK modulation scheme.

5. The demodulation unit of claim 4, wherein
the demodulation unit is configured to determine a plurality of cost values of a cost function for the corresponding plurality of target sets of discrimination signals $d_m[n]$;
the cost function for a particular target set of discrimination signals $d_m[n]$ is indicative of a deviation of the determined set of discrimination signals $\hat{d}_m[n]$ from the particular target set of discrimination signals $d_m[n]$; and
the demodulation unit is configured to determine the transmitted symbol for the current time instant n in dependence of the plurality of cost values of the cost function for the corresponding plurality of target sets of discrimination signals $d_m[n]$.

6. The demodulation unit of claim 5, wherein the cost function $c[n]$ for the particular target set of discrimination signals $d_m[n]$ is determined as $$c[n] = \sum_{m=1}^{Z} \left| wrapToPi(d_m[n] - \hat{d}_m[n]) \right|$$

wherein the function $wrapToPi(\alpha)$ wraps an angle $\alpha$ in radians in the interval $[-\pi, \pi]$ and wherein $Z>1$.

7. The demodulation unit of claim 5, wherein the demodulation unit is configured to determine the transmitted symbol for the current time instant n in dependence of a minimum of the plurality of cost values of the cost function for the corresponding plurality of target sets of discrimination signals $d_m[n]$ $d_m[n]$.

8. The demodulation unit of claim 5, wherein
the demodulation unit is configured to populate a state trellis for the current time instant n using the plurality of cost values of the cost function for the corresponding plurality of target sets of discrimination signals $d_m[n]$;
the state trellis comprises a plurality of different states for the corresponding plurality of target sets of discrimination signals $d_m[n]$; and
the demodulation unit is configured to determine the transmitted symbol for the current time instant n based on cumulated cost values associated with the plurality of different states of the state trellis for the current time instant n.

9. The demodulation unit of claim 8, wherein
the state trellis is indicative of cumulated cost values for the plurality of different states of the state trellis for a previous time instant n−1; and
the demodulation unit is configured to determine the cumulated cost values for the plurality of different states of the state trellis for the current time instant n based on the cumulated cost values for the plurality of different states of the state trellis for the previous time instant n−1 and based on the plurality of cost values of the cost function for the corresponding plurality of target sets of discrimination signals $d_m[n]$.

10. The demodulation unit of claim 8, wherein the state trellis comprises $M^m$ different states.

11. The demodulation unit of claim 1, wherein the transmitted symbol for the current time instant is determined based on the set of discrimination signals using a maximum likelihood detection scheme.

12. The demodulation unit of claim 1, wherein the demodulation unit is configured to derive a current sample of the phase signal, determine a set of discrimination signals, and determine a transmitted symbol for a sequence of current time instants, thereby iteratively recovering a sequence of transmitted symbols.

13. The demodulation unit of claim 1, wherein the MDPSK modulation scheme is π/4DQPSK modulation scheme or an 8DPSK modulation scheme.

14. A method for recovering a transmitted symbol from a received signal that has been modulated using an M-ary Differential Phase Shift Keying, MDPSK, modulation scheme; wherein the method comprises, for a current time instant,
deriving a current sample of a phase signal indicative of a phase of the received signal;
determining a set of discrimination signals for the current sample of the phase signal, based on the current sample of the phase signal and based on one or more previous samples of the phase signal for one or more previous time instants; and determining the transmitted symbol for the current time instant based on the set of discrimination signals;
wherein the set of discrimination signals $\hat{d}_m[n]$, with m=1, ..., Z, for Z>1, the current time instant n is determined as $$\hat{d}_m[n]=\varphi[n]-\varphi[n-m \cdot N_s]$$

wherein $\varphi[n]$ is the current sample of the phase signal for the current time instant n;
wherein $\varphi[n-m \cdot N_s]$ is the previous sample of the phase signal for the previous time instant $n-m \cdot N_s$; and wherein $N_s$ is an oversampling factor with $N_s \geq 1$.

15. A demodulation unit for recovering a transmitted symbol from a received signal that has been modulated using an M-ary Differential Phase Shift Keying, MDPSK, modulation scheme; wherein the demodulation unit is configured to, for a current time instant, derive a current sample of a phase signal indicative of a phase of the received signal;
 determine a set of discrimination signals for the current sample of the phase signal, based on the current sample of the phase signal and based on one or more previous samples of the phase signal for one or more previous time instants; and
 determine the transmitted symbol for the current time instant based on the set of discrimination signals;
and wherein
 the demodulation unit is configured to determine the transmitted symbol for the current time instant n in dependence of a truth table which is indicative of a plurality of target sets of discrimination signals $d_m[n]$ for a corresponding plurality of sets of possibly transmitted symbols;
 the truth table depends on a constellation diagram and possible transitions between constellation points of the constellation diagram of the MDPSK modulation scheme;
 the demodulation unit is configured to determine a plurality of cost values of a cost function for the corresponding plurality of target sets of discrimination signals $d_m[n]$;
 the cost function for a particular target set of discrimination signals $d_m[n]$ is indicative of a deviation of the determined set of discrimination signals $\hat{d}_m[n]$ from the particular target set of discrimination signals $d_m[n]$; and
 the demodulation unit is configured to determine the transmitted symbol for the current time instant n in dependence of the plurality of cost values of the cost function for the corresponding plurality of target sets of discrimination signals $d_m[n]$.

16. A method for recovering a transmitted symbol from a received signal that has been modulated using an M-ary Differential Phase Shift Keying, MDPSK, modulation scheme; wherein the method comprises, for a current time instant, deriving a current sample of a phase signal indicative of a phase of the received signal;
 determining a set of discrimination signals for the current sample of the phase signal, based on the current sample of the phase signal and based on one or more previous samples of the phase signal for one or more previous time instants;
 determining the transmitted symbol for the current time instant based on the set of discrimination signals;
 determining the transmitted symbol for the current time instant n in dependence of a truth table which is indicative of a plurality of target sets of discrimination signals $d_m[n]$ for a corresponding plurality of sets of possibly transmitted symbols; wherein the truth table depends on a constellation diagram and possible transitions between constellation points of the constellation diagram of the MDPSK modulation scheme;
 determining a plurality of cost values of a cost function for the corresponding plurality of target sets of discrimination signals $d_m[n]$; wherein the cost function for a particular target set of discrimination signals $d_m[n]$ is indicative of a deviation of the determined set of discrimination signals $\hat{d}_m[n]$ from the particular target set of discrimination signals $d_m[n]$; and
 determining the transmitted symbol for the current time instant n in dependence of the plurality of cost values of the cost function for the corresponding plurality of target sets of discrimination signals $d_m[n]$.

* * * * *